United States Patent Office 3,156,711
Patented Nov. 10, 1964

3,156,711
NOVEL Δ¹-3-DESOXYANDROSTENE AND Δ¹,³-3-DESOXYANDROSTADIENE DERIVATIVES
Alexander D. Cross and Albert Bowers, Mexico City, Mexico, assignors to Syntex Corporation, Panama, Panama, a corporation of Panama
No Drawing. Filed Oct. 19, 1962, Ser. No. 231,836
17 Claims. (Cl. 260—397.5)

The present invention relates to novel cyclopentanophenanthrene derivatives and to a process for the production thereof.

More particularly the present invention relates to novel Δ¹-3-desoxy androstene derivatives and Δ¹,³-androstadiene-compounds.

The novel compounds of the present invention are represented by the following formula:

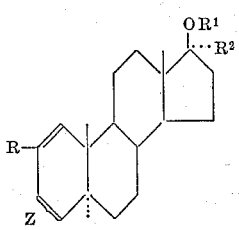

In the above formula R represents hydrogen or methyl; R¹ is hydrogen or a hydrocarbon carboxylic acyl group of less than 12 carbon atoms; R² represents hydrogen, lower alkyl, lower alkenyl or lower alkinyl; and Z represents a double bond or a saturated linkage, each between C-3 and C-4.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups each as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel compounds of the present invention represented by the above formula are anabolic-androgenic agents with a favorable anabolic-androgenic ratio. In addition, they have anti-estrogenic, anti-gonadotrophic, anti-fibrillatory and appetite stimulating properties. Furthermore, they lower the blood cholesterol level, relieve premenstrual tension and suppress the output of the pituitary gland.

The novel compounds of the present invention are prepared in accordance with the following scheme:

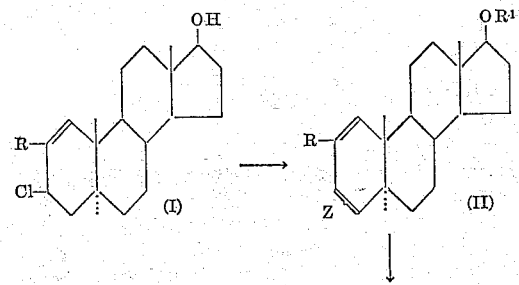

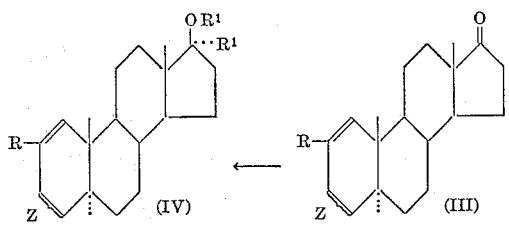

In the above formulae R, R¹, R², and Z have the same meaning as defined hereinbefore.

The starting compound of the process just outlined, which is 3β-chloro-Δ¹-androsten-17β-ol or the 2-methyl derivative thereof, is obtained in accordance with Cross et al. U.S. patent application Serial No. 156,925, filed December 4, 1961, from the corresponding Δ¹-androsten-17β-ol-3-one-acetate by conventional reduction to the corresponding 3β,17β-diol-17-acetate, treatment with thionyl chloride to form the 3β-chloro-17β-ol-17-acetate, and conventional saponification of the acetate grouping to produce the desired 3β-chloro-Δ¹-androsten-17β-ol compound.

In practicing the process exemplified above, the starting Compound (I) is treated with lithium aluminum hydride, preferably in anhydrous tetrahydrofuran, to give the corresponding 3-deschloro-Δ¹-androsten-17β-ol (II: Z=saturated linkage). When the starting Compound (I) is treated with dimethylformamide-pyridine, preferably under reflux conditions, there is obtained the corresponding Δ¹,³-androstadien derivative (II: Z=double bond).

The Δ¹ or Δ¹,³-androstan-17β-ol Compounds (II) are oxidized, preferably with chromium trioxide, to the corresponding 17-ketones (III). The latter 17-ketones, upon treatment with a lower alkyl magnesium halide under conventional conditions, afford the corresponding 17α-lower alkyl-Δ¹-androsten-17β-ol or Δ¹,³-androstadiene derivatives (IV: R¹=H, R²=lower alkyl).

The Δ¹-androsten-17-one or Δ¹,³-androstadien-17-one Compounds (III) upon treatment with a 1-lower alkine, such as acetylene, in the presence of an alkali metal lower alkoxide, such as potassium t-amyloxide, yield the corresponding 17α-lower alkinyl-Δ¹-androsten-17β-ol or Δ¹,³-androstadiene derivatives (IV: R¹=H, R²=lower alkinyl), which upon hydrogenation in the presence of a mild catalyst, such as 2% palladium calcium carbonate, yield the corresponding 17α-lower alkenyl-Δ¹-androsten-17β-ol or Δ¹,³-androstadiene derivatives (IV: R¹=H, R²=lower alkenyl).

The compounds of the present invention having a secondary hydroxyl group, for example in C-17 (II), are conventionally acylated in pyridine with a suitable acylating agent, such as a chloride or an anhydride of a hydrocarbon carboxylic acid of the type defined hereinbefore, thus affording the corresponding acylates.

The compounds of the present invention having in the molecule a tertiary hydroxyl group, e.g. at C-17 (IV), are conventionally esterified in the presence of p-toluenesulfonic acid with an acylating agent, such as acetic anhydride, caproic anhydride, cyclopentylpropionic anhydride or enanthic anhydride, to produce the corresponding esters.

The following specific examples serve to illustrate, but are not intended to limit the scope of the present invention:

*Example I*

A solution of 1 g. of 3β-chloro-Δ¹-androsten-17β-ol-(obtained in accordance with Cross et al. U.S. pat. appl. Ser. No. 156,925, filed December 4, 1961) in 50 cc. of tetrahydrofuran was added over a 30 minutes period to a stirred suspension of 1 g. of lithium aluminum hydride in 50 cc. of anhydrous tetrahydrofuran. The mixture was refluxed for 2 hours, then cooled and cautiously treated with 5 cc. of ethyl acetate and 2 cc. of water. Solid sodium sulfate was added, the inorganic material filtered off and thoroughly washed with hot ethyl acetate, the combined organic solutions upon evaporation yielded a crude material, which was purified by crystallization from acetone-hexane thus giving Δ¹-androsten-17β-ol.

By the same procedure, 2-methyl - 3β - chloro-Δ¹-androsten-17β-ol (obtained according to the aforesaid patent application) was converted into 2-methyl-Δ¹-androsten-17β-ol.

*Example II*

To a solution of 1 g. of 3β-chloro-Δ¹-androsten-17β-ol in 50 cc. of dimethyl formamide were added 2.2 molar equivalents of pyridine and the resulting mixture was refluxed for 3 hours. Thereafter it was cooled, poured into water and the obtained precipitate was filtered off, dried and recrystallized from acetone-hexane, thus yielding Δ¹,³-androstadien-17β-ol.

By the same procedure, 2-methyl-3β-chloro-Δ¹-androstan-17β-ol was transformed into 2-methyl - Δ¹,³ - androstadien-17β-ol.

*Example III*

A solution of 1 g. of Δ¹-androsten-17β-ol in 10 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave Δ¹-androsten-17-one.

By the same procedure 2-methyl-Δ¹-androsten-17β-ol, 2-methyl-Δ¹,³-androstadien-17β-ol and Δ¹,³-androstadien-17b-ol were converted respectively into 2-methyl-Δ¹-androsten-17-one, 2-methyl - Δ¹,³ - androstadien-17-one, and Δ¹,³-androstadien-17-one.

*Example IV*

A solution of 5 g. of Δ¹-androsten-17-one in 250 cc. of thiophene-free benzene was treated with 27.5 cc. of 4 N methylmagnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded 17α-methyl-Δ¹-androsten-17β-ol.

By applying the same procedure to 2-methyl-Δ¹-androsten-17-one, 2-methyl - Δ¹,³ - androstadien-17-one and Δ¹,³ - androstadien - 17 - one, there were respectively produced 2,17α-dimethyl-Δ¹-androsten-17β-ol, 2,17α-dimethyl-Δ¹,³-androstadien-17β-ol and 17α-methyl - Δ¹,³ - androstadien-17β-ol.

*Example V*

A solution of 1 g. of Δ¹-androsten-17-one, in 30 cc. of anhydrous benzene was added, under nitrogen, to a solution prepared by dissolving 1.4 g. of potassium in 30 cc. of t-amyl alcohol. A slow current of purified acetylene was passed through the solution for 40 hours, whereupon the solution was diluted with water and extracted with benzene. The organic extracts were then washed to neutral and dried over anhydrous sodium sulfate. Evaporation of the solvent and chromatography of the residue on 70 g. of alkaline alumina gave in the hexane-benzene fractions a product, which upon recrystallization from acetone-hexane afforded 17α-ethinyl-Δ¹-androsten-17β-ol.

By the same procedure, 2-methyl-Δ¹-androsten-17-one, 2-methyl-Δ¹,³-androstadien-17-one and Δ¹,³-androstadien-17-one were respectively converted into 2-methyl - 17α-ethinyl-Δ¹-androsten-17β-ol, 2-methyl-17α-ethinyl-Δ¹,³-androstadien - 17β - ol and 17α-ethinyl - Δ¹,³ - androstadien-17β-ol.

*Example VI*

A solution of 1 g. of 17α-ethinyl-Δ¹-androsten-17β-ol in 40 cc. of pyridine was hydrogenated at 25° C. and 570 mm. in the presence of 4400 mg. of pre-hydrogenated 2% palladium-calcium carbonate catalyst.

When 1.1 molar equivalent of hydrogen had been absorbed, the reaction was stopped, the catalyst separated by filtration through celite, washed with ethyl acetate and the combined solutions evaporated to dryness in vacuo, yielding the crude vinyl derivative. This crude product was dissolved in ethyl acetate, the organic solution washed with dilute hydrochloric acid and water to neutral, dried and evaporated to dryness. Recrystallization from acetone gave 17α-vinyl-Δ¹-androsten-17β-ol.

By applying the same procedure to 2 - methyl - 17α-ethinyl - Δ¹ - androsten - 17β - ol, 2 - methyl-17α-ethinyl-Δ¹,³ - androstadien - 17β - ol and 17α-ethinyl - Δ¹,³-androstadien-17β-ol, there were respectively obtained 2-methyl-17α - vinyl - Δ¹ - androsten - 17β - ol, 2 - methyl - 17α-vinyl-Δ¹,³-androstadien-17β-ol and 17α-vinyl-Δ¹,³ - androstadien-17β-ol.

*Example VII*

A mixture of 1 g. of Δ¹-androsten-17β-ol, 4 cc. of pyridine and 2 cc. of acetic anhydride was kept at room temperature overnight, poured into ice water, the formed precipitate was filtered, washed with water and dried. Crystallizaiton from acetone-hexane gave Δ¹-androsten-17β-ol acetate.

Following the same procedure, there were treated 2-methyl-Δ¹-androsten-17β-ol, 2-methyl-Δ¹,³-androstadien-17β-ol, and Δ¹,³-androstadien-17β-ol, thus giving respectively 2-methyl-Δ¹-androsten-17β-ol acetate, 2-methyl-Δ¹,³-androstadien-17β-ol acetate and Δ¹,³-androstadien-17β-ol acetate.

*Example VIII*

The starting compounds of Example VII were treated following exactly the procedure described in that example, except that acetic anhydride was substituted by caproic anhydride, propionic anhydride, enanthic anhydride and cyclopentylpropionic anhydride thus affording respectively the corresponding caproates, propionates, enanthates and cyclopentylpropionates of said starting compounds.

*Example IX*

To a solution of 5 g .of 17α-methyl-Δ¹-androsten-17β-ol in 100 cc. of anhydrous benzene there were added 1 g. of p-toluenesulfonic acid and 10 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 17α-methyl-Δ¹-androsten-17β-ol caproate.

The starting compounds listed under A, were treated in accordance with the above procedure, thus affording the products set forth under B.

| A | B |
|---|---|
| 2,17α-dimethyl-Δ¹-androsten-17β-ol | 2,17α-dimethyl-Δ¹-androsten-17β-ol caproate. |
| 17α-ethinyl-Δ¹-androsten-17β-ol | 17α-ethinyl-Δ¹-androsten-17β-ol caproate. |
| 2-methyl-17α-ethinyl-Δ¹-androsten-17β-ol. | 2-methyl-17α-ethinyl-Δ¹-androsten-17β-ol caproate. |
| 17α-vinyl-Δ¹-androsten-17β-ol | 17α-vinyl-Δ¹-androsten-17β-ol caproate. |
| 2-methyl-17α-vinyl-Δ¹-androsten-17β-ol. | 2-methyl-17α-vinyl-Δ¹-androsten-17β-ol caproate. |
| 17α-methyl-Δ¹,³-androstadien-17β-ol. | 17α-methyl-Δ¹,³-androstadien-17β-ol caproate. |
| 2,17α-dimethyl-Δ¹,³-androstadien-17β-ol. | 2,17α-dimethyl-Δ¹,³-androstadien-17β-ol caproate. |
| 17α-ethinyl-Δ¹,³-androstadien-17β-ol. | 17α-ethinyl-Δ¹,³-androstadien-17β-ol caproate. |
| 2-methyl-17α-ethinyl-Δ¹,³-androstadien-17β-ol. | 2-methyl-17α-ethinyl-Δ¹,³-androstadien-17β-ol-caproate. |
| 17α-vinyl-Δ¹,³-androstadien-17β-ol | 17α-vinyl-Δ¹,³-androstadien-17β-ol caproate. |
| 2-methyl-17α-vinyl-Δ¹,³-androstadien-17β-ol. | 2-methyl-17α-vinyl-Δ¹,³-androstadien-17β-ol caproate. |

*Example X*

The starting compounds of Example IX were treated following exactly the procedure described in that example, except that caproic anhyride was substituted by acetic anhydride, propionic anhydride, enanthic anhydride and cyclopentylpropionic anhydride, thus affording respectively the corresponding acetates, propionates, enanthates and cyclopentylpropionates of said starting compounds.

I claim:
1. A compound of the following formula:

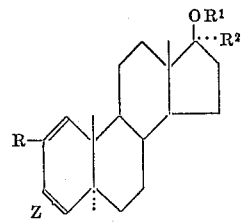

wherein R is selected from the group consisting of hydrogen and methyl; $R^1$ is a member of the group consisting of hydrogen and a hydrocarbon carboxylic acyl group of less than twelve carbon atoms; $R^2$ is selected from the group consisting of hydrogen, lower alkyl, lower alkenyl, and lower alkinyl; and Z is a member of the group consisting of a double bond and a saturated linkage, each between C–3 and C–4.
2. Δ¹-androsten-17β-ol.
3. 2-methyl-Δ¹-androsten-17β-ol.
4. Δ¹,³-androstadien-17β-ol.
5. 2-methyl-Δ¹,³-androstadien-17β-ol.
6. 17α-methyl-Δ¹-androsten-17β-ol.
7. 2,17α-dimethyl-Δ¹-androsten-17β-ol.
8. 17α-ethinyl-Δ¹-androsten-17β-ol.
9. 2-methyl-17α-ethinyl-Δ¹-androsten-17β-ol.
10. 17α-vinyl-Δ¹-androsten-17β-ol.
11. 2-methyl-17α-vinyl-Δ¹-androsten-17β-ol.
12. 17α-methyl-Δ¹,³-androstadien-17β-ol.
13. 2,17α-dimethyl-Δ¹,³-androstadien-17β-ol.
14. 17α-ethinyl-Δ¹,³-androstadien-17β-ol.
15. 2-methyl-17α-ethinyl-Δ¹,³-androstadien-17β-ol.
16. 17α-vinyl-Δ¹,³-androstadien-17β-ol.
17. 2-methyl-17α-vinyl-Δ¹,³-androstadien-17β-ol.

No references cited.